US012678711B2

(12) United States Patent　　(10) Patent No.:　US 12,678,711 B2
Gebauer　　　　　　　　　　　　(45) Date of Patent:　Jul. 14, 2026

(54) PARALLEL SEPARATION SYSTEM

(75) Inventor: Klaus Gebauer, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 785 days.

(21) Appl. No.: 13/637,744

(22) PCT Filed: Mar. 30, 2011

(86) PCT No.: PCT/SE2011/050361
§ 371 (c)(1),
(2), (4) Date: Sep. 27, 2012

(87) PCT Pub. No.: WO2011/123039
PCT Pub. Date: Oct. 6, 2011

(65) Prior Publication Data
US 2013/0026100 A1　　Jan. 31, 2013

(30) Foreign Application Priority Data
Mar. 31, 2010　(SE) .................................... 1050303-5

(51) Int. Cl.
B01D 15/18　　　　(2006.01)
G01N 30/32　　　　(2006.01)
(Continued)

(52) U.S. Cl.
CPC ............. B01D 15/18 (2013.01); G01N 30/32 (2013.01); G01N 30/466 (2013.01); G01N 30/8658 (2013.01)

(58) Field of Classification Search
None
See application file for complete search history.

(56) References Cited

U.S. PATENT DOCUMENTS 6,386,014 B1　5/2002　Butch
6,491,816 B2 *　12/2002　Petro ............................... 506/43
(Continued)

FOREIGN PATENT DOCUMENTS

DE　19957489 A1　5/2000
EP　0 240 725　10/1987
(Continued)

OTHER PUBLICATIONS

WO20000012199. Hartmann. Drawings.*
(Continued)

*Primary Examiner* — Kara M Peo
(74) *Attorney, Agent, or Firm* — Eversheds-Sutherland (US) LLP

(57)　　　　ABSTRACT

A method in a separation system including parallel fluid paths each having a separation module and an adjustable flow restrictor positioned downstream of the separation module. The method includes (1) measuring hydraulic resistance in each of the parallel fluid paths by stopping fluid flow through all but one of the parallel fluid paths, (2) identifying which of the parallel fluid paths has a hydraulic resistance higher than the parallel fluid paths remaining in the separation system, and (3) adjusting the adjustable flow restrictors in each of the parallel fluid paths separately. The adjustable flow restrictors are adjusted such that the hydraulic resistance in each parallel fluid path is approximately equal to or higher than the hydraulic resistance of the parallel fluid path identified to have the highest hydraulic.

11 Claims, 5 Drawing Sheets

(51) Int. Cl.
    *G01N 30/46* (2006.01)
    *G01N 30/86* (2006.01)

(56) References Cited

U.S. PATENT DOCUMENTS

| | | |
|---|---|---|
| 6,911,151 B1 | 6/2005 | Muller-Kuhrt et al. |
| 2001/0013494 A1 | 8/2001 | Maiefski et al. |
| 2001/0014295 A1 | 8/2001 | Goto et al. |
| 2004/0104173 A1 | 6/2004 | Manach et al. |
| 2005/0109698 A1 | 5/2005 | Gerhardt et al. |
| 2007/0074766 A1 | 4/2007 | Klee et al. |
| 2009/0145851 A1* | 6/2009 | Witt .............................. 210/741 |

FOREIGN PATENT DOCUMENTS

| | | |
|---|---|---|
| EP | 0 495 255 | 7/1992 |
| EP | 0 458 125 | 8/1995 |
| EP | 1 850 129 | 10/2007 |
| JP | 60-115854 | 6/1985 |
| JP | 02-051061 | 2/1990 |
| JP | 2006-292636 | 10/2006 |
| WO | 2000/012199 | 3/2000 |
| WO | WO 2002/056006 | 7/2002 |
| WO | WO 2005/018770 | 3/2005 |
| WO | 2008064242 A2 | 5/2008 |

OTHER PUBLICATIONS

EP Search Report Dated May 9, 2014 Issued On Corresponding EP Application No. 11763151.5.

CN Search Report Dated Feb. 16, 2014 Issued On Corresponding CN Patent Application No. 201180017907.3.

Search Report in corresponding EP Appl No. 11763151.5 issued Sep. 30, 2016.

Summons to Oral Proceedings Pursuant to rule 115(1) EPC Received for EP Patent Application No. 11763151.5, mailed on Dec. 21, 2017, 5 Pages.

Colleen K. Van Pelt et al., "A Four-Column Parallel Chromatography System for Isocratic or Gradient LC/MS Analyses", Analytical Chemistry, vol. 73, No. 3, Feb. 1, 2001, pp. 582-588.

Ralf God et al., "Parallele HPLC zur Hochdurchsatzfraktionierung van Naturstoffextrakten*", Chemie/Ingenieur Technik 73, Jan. 1, 2001, pp. 891-894.

* cited by examiner

PARALLEL SEPARATION SYSTEM

CROSS-REFERENCE TO RELATED APPLICATIONS

This application is a filing under 35 U.S.C. 371 of international application number PCT/SE2011/050361, filed Mar. 30, 2011, published on Oct. 6, 2011 as WO 2011/123039, which claims priority to application number 1050303-5 filed in Sweden on Mar. 31, 2010.

TECHNICAL FIELD OF THE INVENTION

The present invention relates to a method in a separation system comprising parallel fluid paths each comprising a separation module and to system comprising a number of parallel fluid paths, wherein each parallel fluid path comprises a separation module.

BACKGROUND OF THE INVENTION

The use of separation modules, such as chromatography columns or cartridges, in a parallel configuration has a potential to reduce cost and increase flexibility in pilot and process scale bio-manufacturing. However, there are a number of problems associated with this concept. One of the problems is that the separation efficiency will decrease due to non-uniform flow over the individual modules in the parallel assembly.

SUMMARY

One object of the invention is to improve the separation efficiency in a parallel assembly of separation modules by achieving a uniform flow over all individual modules in the parallel assembly.

This is achieved in a method according to claim 1 and in a system according to claim 10. Hereby a method and a system are achieved where the hydraulic resistance of each parallel fluid path can be adjusted such that all the fluid paths of the system has substantially the same hydraulic resistance.

Another object of the invention is to provide a separation system in a parallel configuration that meets and exceeds the requirements of quality systems used in manufacture and testing of active pharmaceutical ingredients, diagnostics, foods, pharmaceutical products, and medical devices. Examples for such quality systems are "Good manufacturing practice" or "GMP" that outline the aspects of production and testing that can impact the quality of a product. A basic principle in GMP is for example that manufacturing processes need to be clearly defined and controlled. All critical processes need to be validated to ensure consistency and compliance with specifications.

Further, records are to be made, manually or by instruments, during manufacture and these records shall enable the complete history of a batch to be traced and retained in a comprehensible and accessible form. GMP's are enforced by regulatory bodies, in the United States by the US FDA, for example under Section 501(B) of the 1938 Food, Drug, and Cosmetic Act (21USC351). The regulations use the phrase "current good manufacturing practices" (CGMP) to describe these guidelines.

Another object of the invention is to meet particularly the validation requirements that fall under GMP when using a separation system in a parallel configuration, such as process and cleaning validation.

Another object of the invention is to meet particularly the qualification requirements that fall under GMP when using a separation system in a parallel configuration, such as process and design qualification (DQ), component qualification (CQ), installation qualification (IQ), operational qualification (OQ), process qualification (PQ).

A further object of the invention is to meet particularly the documentation requirements that fall under GMP when using an automated separation system in a parallel configuration and especially to provide electronic data and records required to meet and exceed the validation and qualification requirements.

Further suitable embodiments of the invention are described in the dependent claims.

DETAILED DESCRIPTION OF THE EMBODIMENTS

Figure 1:
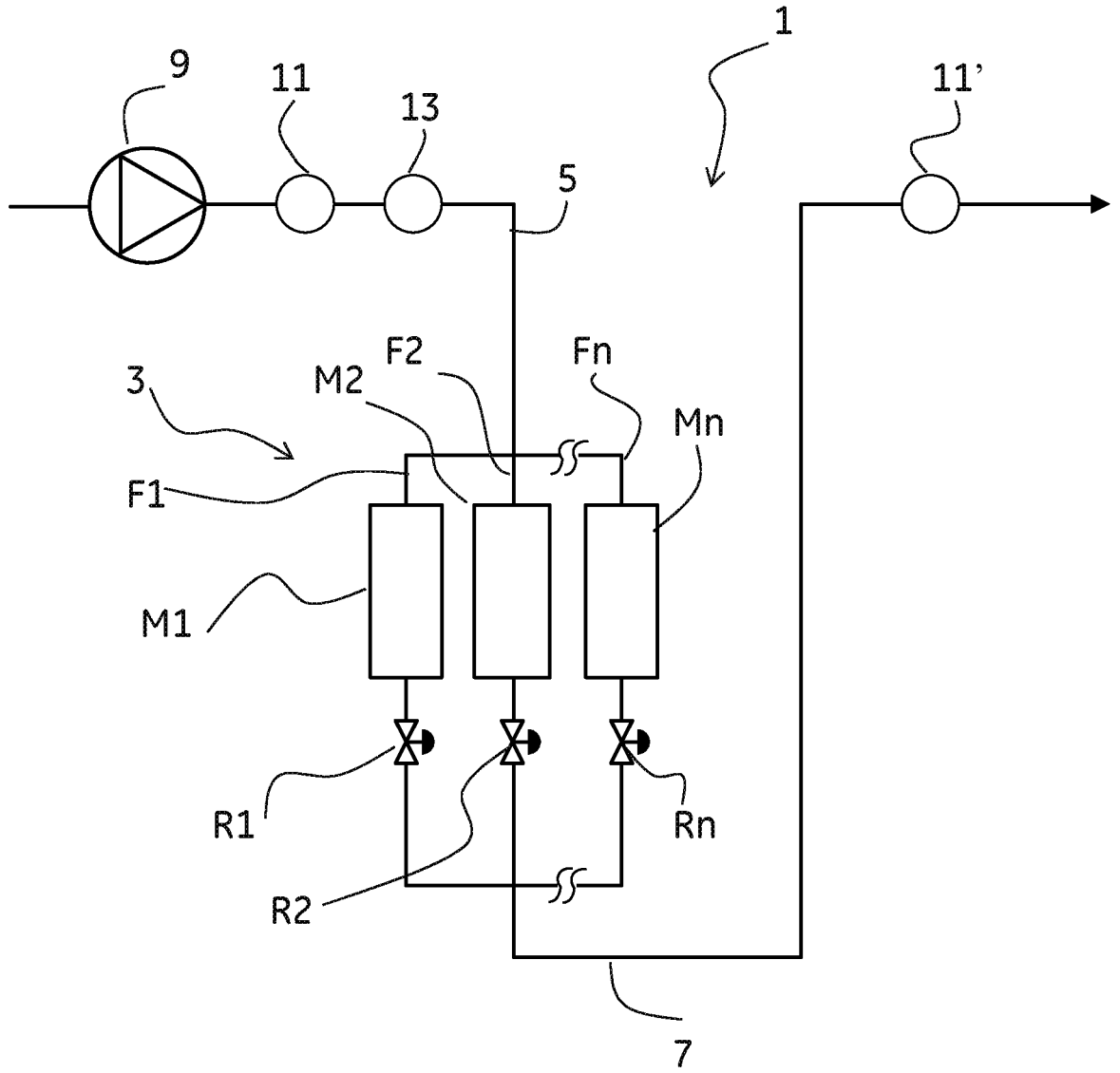
FIG. 1 shows schematically a separation system comprising a parallel assembly of separation modules according to one embodiment of the invention.

FIG. 1 shows schematically a separation system 1 comprising a parallel assembly 3 of separation modules M1, M2, . . . Mn according to one embodiment of the invention. The parallel assembly 3 comprises a number of parallel fluid paths F1, F2, . . . Fn. Three fluid paths are shown here but it could be any number of parallel fluid paths. Each fluid path F1, F2, . . . Fn comprises a separation module M1, M2, . . . Mn. According to the invention each fluid path F1, F2, . . . Fn also comprises an adjustable flow restrictor R1, R2, . . . Rn. The adjustable flow restrictors R1, R2, . . . Rn should be possible to open completely, i.e. adjust to a position where no flow restriction is provided. Suitably the flow restrictors should also be possible to close completely, i.e. adjust such that no flow at all can pass. Alternatively or complementary a valve can be provided in each fluid path F1, F2, . . . Fn such that the fluid paths can be opened or closed. The separation system 1 further comprises an inlet fluid path 5 entering the parallel assembly 3 and an outlet fluid path 7 leaving the parallel assembly 3. The inlet fluid path 5 comprises in this embodiment a pump 9, a flow meter 11 and a pressure sensor 13. Alternatively the flow meter could be positioned downstream the parallel assembly 3, which is shown as flow meter 11'. In another alternative embodiment, the pump 9 in the separation system is a pump of metering type, hereby allowing for a prior determination of delivered flow rate by calculation from a number of pump revolutions, a displaced volume or similar. In this alternative, flow meters 11 and 11' described above may be omitted as the flow rate is pre-determined. Yet another alternative embodiment of the system may employ a calibration curve for the system pump to avoid the need for a flow meter in the system.

The separation modules M1, M2, . . . Mn can be chromatography columns packed with a porous matrix, which fall in the category of fixed beds. Alternatively, the separation modules M1, M2, . . . Mn could be expanded or fluidized bed columns. It is obvious that the invention can also be applied to reaction modules and columns, here including fixed bed systems as well as expanded and fluidized bed systems aimed for changing, coupling or modifying a substance by contact with the particulate matter in the reactor.

In some embodiments, the separation modules M1, M2, . . . Mn are preferably disposable modules, hereby allowing the use of inexpensive standardized disposable modules in a parallel fashion to adapt to the capacity required in the specific application.

Single use systems, also called disposable systems are more and more used in the bioprocess industry. For example separation or reaction systems such as chromatography systems, filter systems or bioreactor systems have today at least partly been provided as disposable systems. This eliminates the need for cleaning and cleaning validation before processing, in between processes and cycles or after processing before re-use as required for conventional re-usable equipment. With disposable systems cross-contamination is avoided.

The wetted part of the adjustable flow restrictors R1, R2, . . . Rn may be part of the corresponding separation modules itself and can therefore be disposable and of low cost. The controlling unit of the adjustable restrictors may be re-usable, like a pinch valve principle, for example.

Figure 2:
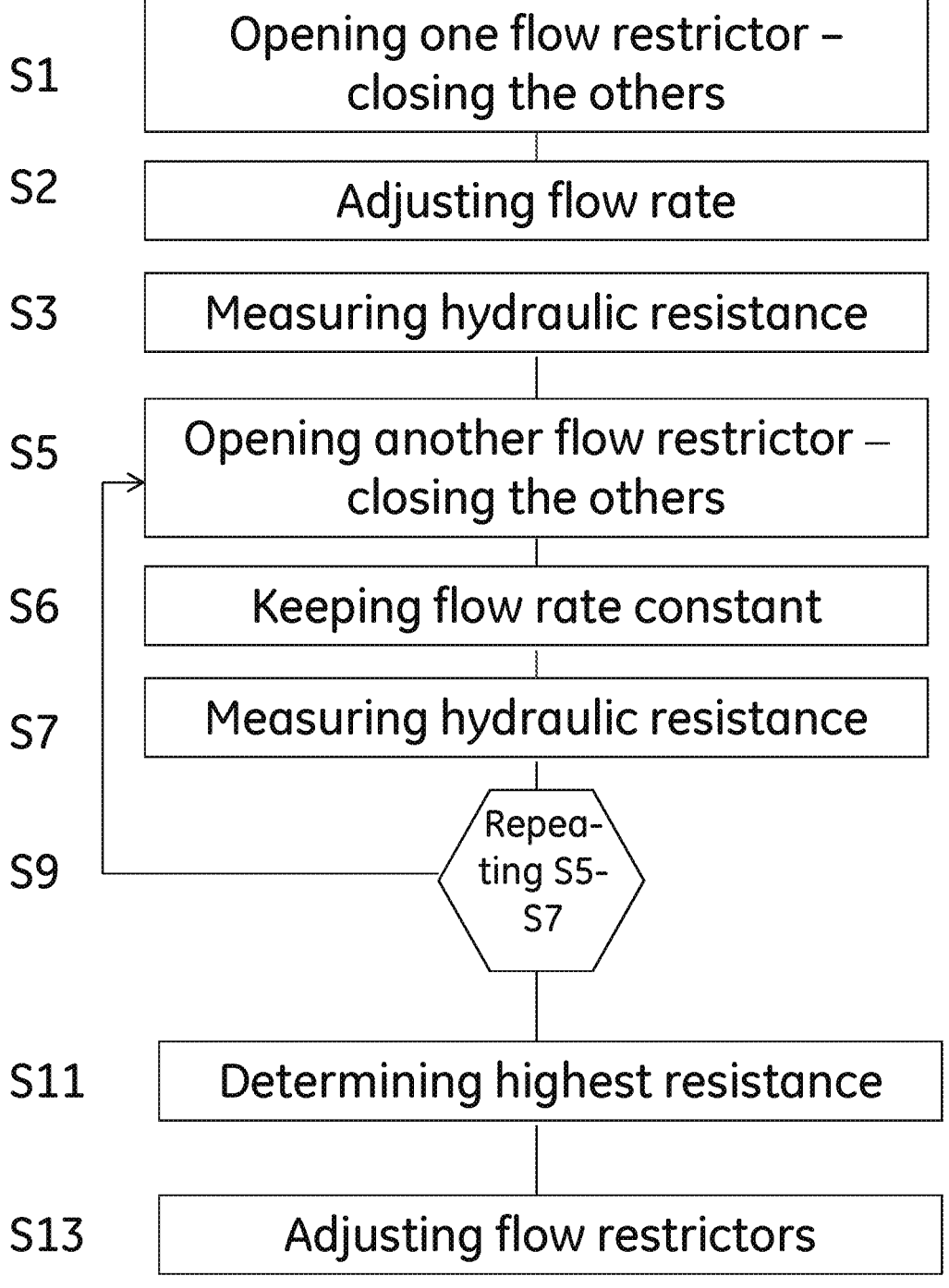
FIG. 2 is a flow chart of the method of the invention according to one embodiment of the invention.

FIG. 2 is a flow chart of the method of the invention according to one embodiment of the invention. The method steps are described in order below.

S1: Opening one of the flow restrictors R1, R2, . . . Rn completely and at the same time closing all other flow restrictors completely, i.e. there will only be flow through one of the separation modules M1, M2, . . . Mn.

S2: Adjusting flow rate for hydraulic resistance measurement. Hydraulic resistance is measured by relating the measured pressure drop over the fluid line to the actual flow rate in this line, the latter may be measured by a flow meter or may be known in case of a metering pump or when using a calibration curve. In this example, the flow rate is adjusted to a defined constant flow rate. In practice, the flow rate will often be adjusted in proportion to the number of modules in the parallel assembly. For example, for a system set up with 5 modules that shall be operated in parallel with a system flow rate of 100 l/h over all modules, a flow rate of 100/5=20 l/h is suitably applied to the individual module when running the sequential identification of hydraulic resistance at each individual module and also when adjusting the hydraulic resistance subsequently. However, any constant flow rate could be applied as long as it allows for a predictable and scalable measurement and adjustment of the hydraulic resistance that ensures the synchronization of the parallel assembly described by this invention. Given that this condition is followed, even different flow rates may be applied for measuring and adjusting the hydraulic resistance(s). Preferably, the flow rate selected in practice would be constant and within the range of typical operating flow rates suitable for the separation module and parallel assembly.

S3: Measuring the hydraulic resistance of the system, i.e. of the only fluid path that is open. The hydraulic resistance is suitably measured by measuring a pressure loss over the open fluid path by a pressure sensor positioned upstream the parallel fluid path to be characterised. (pressure sensor 13 in FIG. 1)

The hydraulic resistance of the system measured in S3 is substantially equal to the hydraulic resistance of the separation module in the fluid path where the flow restrictor has been completely opened.

S5: Opening another one of the flow restrictors R1, R2, . . . Rn completely and closing the others completely.

S6: Keeping the flow rate at the same constant level as in S2. If the pressure loss over the fluid path and separation module is in linear proportion to the flow rate over a wider range, the hydraulic resistance may be measured at different flow rates within said linear range. However, in practice the flow rate will be selected to the same constant level for measuring the resistance in all parallel lines.

S7: Measuring the hydraulic resistance of the system, i.e. the pressure loss over the fluid path comprising the flow restrictor that now is completely open. That is now the measure of the hydraulic resistance of the separation module comprised in that fluid path.

S9: Repeating the steps S5-S7 until all flow restrictors R1, R2, . . . Rn has been completely opened and the hydraulic resistance of each one of the separation modules has been measured alone.

S11: Determining which one of the separation modules M1, M2, . . . Mn having the highest hydraulic resistance. This is determined by comparing the measurement results from S3 and S7 above.

S13: Adjusting the adjustable flow restrictors R1, R2, . . . Rn such that the hydraulic resistance of all the parallel fluid paths F1, F2, . . . Fn is substantially the same as the hydraulic resistance of the separation module with highest hydraulic resistance. The goal is to achieve the same hydraulic resistance in all parallel fluid paths. Substantially the same is used here just to make it clear that it is hard to achieve exactly the same hydraulic resistance and also small differences should be covered by this invention. The differences should not be more than 10%, preferably less than 5%, and most preferable less than 2.5%. Hereby, the flow restrictor provided in the fluid path comprising the separation module having the highest hydraulic resistance need not be adjusted but kept open and all the other flow restrictors need to be adjusted such that the total hydraulic resistance in each fluid path, i.e. hydraulic resistance of separation module and flow restrictor, equals the hydraulic resistance of the separation module with highest hydraulic resistance. When performing the adjusting the flow rate is kept at the same constant level as in S2 and S6. Only the flow path comprising the flow restrictor to be adjusted is open and all other flow paths are closed and the pressure loss over the open flow path is watched by the pressure sensor. The adjustable restrictor of the open fluid path is adjusted until the measured pressure loss is equal to the pressure loss measured for the fluid path having the highest pressure loss (in other words hydraulic resistance) as measured in S3 and S5. By adjusting the hydraulic resistance in each flow path to match the characteristics of the flow path with the highest resistance as described above, the final pressure drop over the complete parallel assembly will be kept as low as possible, and required, respectively. Alternatively, it is of course possible to adjust the hydraulic resistance in each fluid path in the parallel assembly to match a hydraulic resistance that is higher than the measured highest hydraulic resistance in the fluid path of highest resistance. Hereby, the overall objective of synchronising the hydraulic resistance between all fluid paths will still be achieved, however, this will be on expense of higher overall pressure drop over the system at the operating flow rate.

An alternative to the procedure of measuring hydraulic resistance described above would be to measuring the hydraulic resistance of all fluid paths except one sequentially and additionally measuring the hydraulic resistance of the whole system and using these measurements (i.e. subtracting the hydraulic resistance of each separately measured fluid path from the hydraulic resistance for the whole system) for achieving the hydraulic resistance of also the last fluid path.

An alternative to the preferred embodiment described in FIG. 1 where a single pressure sensor 13 is used to determine the pressure drop over each and every fluid line during the adjustment of hydraulic resistance, pressure sensors could be provided in each fluid path of the parallel assembly 3 upstream the respective separation modules M1 . . . Mn to measure the pressure drop in the fluid paths F1 . . . Fn. However, it is the objective of this invention to simplify the instrumentation and equipment needed for adjusting the parallel assembly and therefore the use of a single pressures sensor in the system 1 upstream the parallel assembly 3 is preferable.

These method steps described above can suitable be automated. In that case a control system is provided that a) measures, stores and compares sensor signals and information on pressure low and flow rate for each fluid line, b) controls the sequential procedure for synchronizing the hydraulic resistance, and c) controls the position of the restrictors.

The method steps described above can also suitably be repeated between process cycles or process steps. This can be suitable if the hydraulic resistance of the fluid paths will vary somewhat after time due to aging, alteration or similar of the chromatography matrix inside the separation module, for example.

Figure 3:
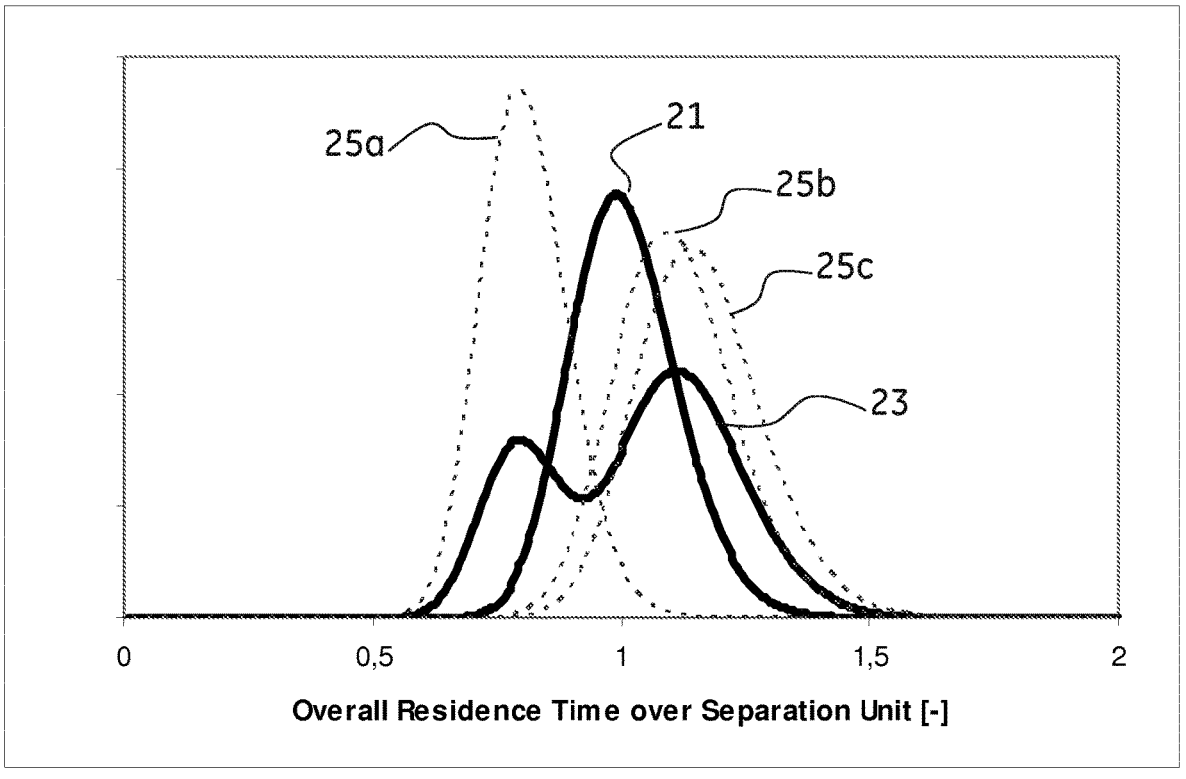
FIG. 3 shows a pulse response diagram for one example of a parallel assembly comprising three separation modules.

FIG. 3 shows a pulse response diagram for one example of a parallel assembly comprising three separation modules, here chromatography columns. This is just a fictive example showing how different hydraulic resistance in the fluid paths of the parallel assembly can affect the response. An assumption here is that all columns have the same target capacity (in terms of mass/column volume) and the same chromatographic efficiency in terms of plate height. They shall differ only by their individual hydraulic resistance. A first curve 21 is shown in the diagram and this is the nominal response, i.e. ideal output pulse in a system where the hydraulic resistances of all fluid paths are equal as response to a pulse sent into the system. A second curve 23 is the actual response in this specific fictive example that results from a parallel assembly of three separation modules that are not synchronized in regard to their hydraulic resistance and where all three modules are of different hydraulic resistance. The actual response of the separation system shown by curve 23 indicates that the hydraulic resistance of the different fluid paths not are equal as it deviates from the ideal response, curve 21. A third, a fourth and a fifth curve 25a, 25b, 25c are theoretic curves of responses from each one of the fluid paths. Here it is clear that the fourth and fifth curves 25b, 25c correspond to two fluid paths having a greater hydraulic resistance than the fluid path corresponding to the third curve 25a, which is obvious by the fact that the average residence time for curve 25a is smaller than for curves 25b and 25c. The smaller residence time is due to the smaller hydraulic resistance over this fluid line in comparison to the other two lines.

An adjustment of hydraulic resistance in a parallel assembly according to the invention will ideally result in a pulse response diagram where all curves will superimpose to the nominal pulse response, curve 21.

Figure 4:
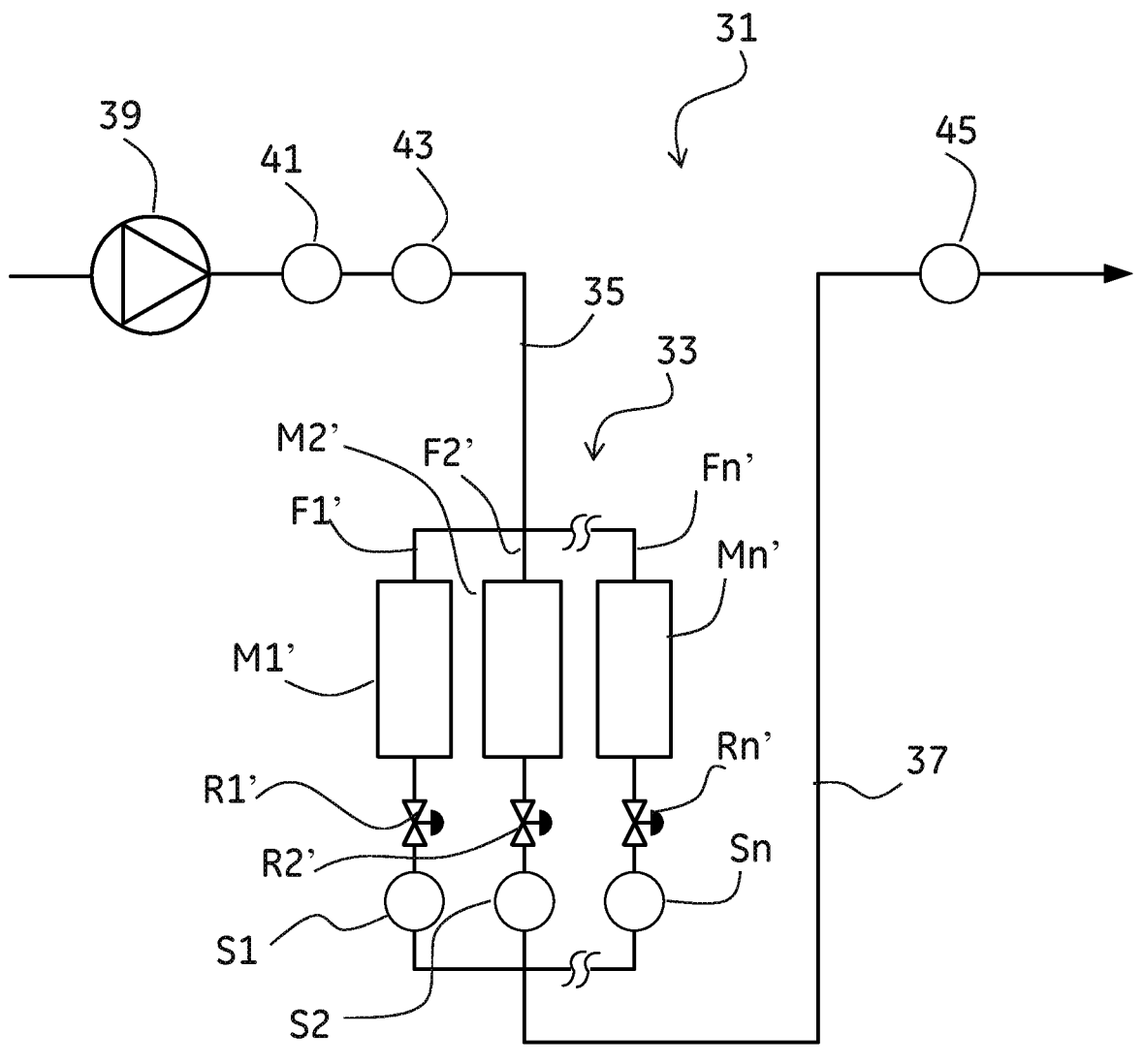
FIG. 4 shows schematically a separation system comprising sensors according to one embodiment of the invention.

FIG. 4 shows schematically a separation system 31 comprising a parallel assembly 33 of separation modules M1', M2', . . . Mn' according to one embodiment of the invention. The parallel assembly 33 comprises a number of parallel fluid paths F1', F2', . . . Fn'. Three fluid paths are shown here but it could be any number of parallel fluid paths. Each fluid path F1', F2', . . . Fn' comprises a separation module M1', M2', . . . Mn'. According to the invention each fluid path F1', F2', . . . Fn' also comprises an adjustable flow restrictor R1', R2', . . . Rn' as described above. The separation system 31 further comprises an inlet fluid path 35 entering the parallel assembly 33 and an outlet fluid path 37 leaving the parallel assembly 33. The inlet fluid path 35 comprises in this embodiment a pump 39, a flow meter 41 and a pressure sensor 43. According to this embodiment of the invention each fluid path F1', F2', . . . F3' also comprises a sensor S1, S2, . . . Sn and the outlet fluid path 37 in the system 31 comprises at least one system sensor 45. Sensors S1, . . . Sn and system sensor 45 are adapted to measure the residence time and/or chromatographic efficiency over each individual separation module M1', M2', . . . Mn' when running the separation modules in parallel and at the same time these features can also be measured on a system level by means of the system sensor 45. Hereby the overall response on system level as measure by the system sensor 45 can be compared to the individual response of each separation module as measured by the sensors S1 . . . Sn. In an alternative embodiment of the invention sensors S1, . . . Sn are only provided in all the fluid paths except from one. The sensor response from the last fluid path can still be calculated by using the response from the system sensor and subtracting the other sensor responses. Suitably, these sensors are disposable probes measuring different fluid properties such as for example flow rate, concentration, force, pressure, temperature, conductivity, pH or the absorbance, reflectance or emission of light as for example the measurement of UV absorbance.

Figure 5:
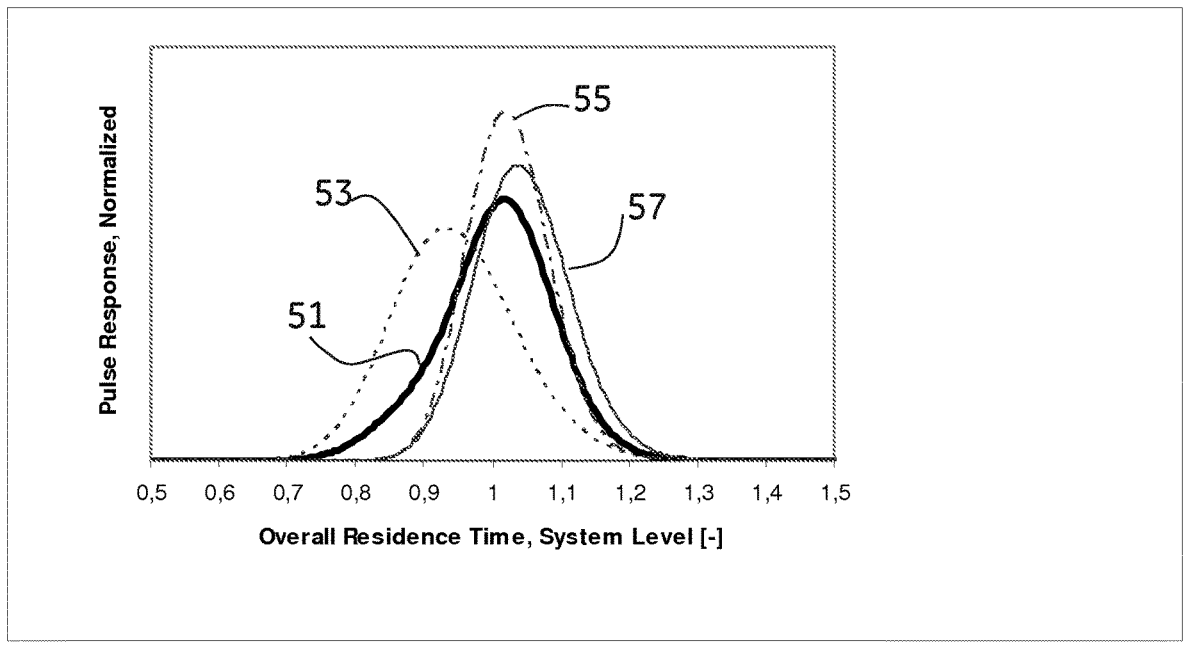
FIG. 5 shows a pulse response diagram for one example according to the embodiment shown in FIG. 4.

FIG. 5 shows a pulse response diagram for one example according to the embodiment shown in FIG. 4. In this example there are three fluid paths. F1', F2', F3' and thus three separation modules M1', M2', M3'. The curve denoted 51 shows the actual response on system level, i.e. measured by the system sensor 45. Here residence time is measured as the average residence time calculated by integration over the curve. In a simplified procedure, residence time may be deducted from the residence time at the maximum pulse response (maximum height of the peak). The leading in the curve suggests that either one (or more) module(s) in the parallel system may deviate from the nominal response in terms of residence time or that at least one module may have a packed bed efficiency showing excessive leading. However, the overall response signal alone gives no detailed information about the status of the individual modules and the root cause for the leading in the curve. This information can only be provided by the signals form the individual modules. The curve denoted 53 shows the actual response as measured in the first sensor S1 in the first fluid path F1'. This is hereby the actual response from the first separation module M1' when run in parallel with the other separation modules M2', M3' of the system. The curve denoted 55 shows the actual response as measured in the second sensor S2 in the second fluid path F2'. This is hereby the actual response from the second separation module M2' when run in parallel with the other separation modules M1', M3' of the system. The curve denoted 57 shows the actual response as measured in the third sensor S3 in the third fluid path F3'. This is hereby the actual response from the third separation module M3' when run in parallel with the other separation modules M1', M2' of the system. For the example discussed here, all of the separation modules have residence time curves of symmetric shape, but one separation module, the first separation module M1', has a decreased average residence time. This reveals that the hydraulic resistance for this module is lower and the actual flow rate higher than for the other modules, respectively. As a result, the assessment of signals on the subsystem level gives full insight in the efficiency of the parallel assembly as required for GMP manufacturing processes. Acceptance criteria for the performance of the individual separation modules as well as for the overall performance of the parallel assembly (as measured using sensor 45) can be set and monitored at installation of the parallel assembly as well as before and throughout a process. Three main parameters would typically be measured and evaluated for a parallel assembly of chromatography modules:

a) average residence time for each module in the parallel assembly compared to the average residence time in the response curve on system level b) chromatographic efficiency in terms of peak width (band broadening) for each module in the parallel assembly compared to the peak width for the response curve on system level, and c) peak symmetry for the response curve for each module in the parallel assembly compared to the symmetry in the response curve on system level.

In order to reduce complexity and cost of systems for purposes of control and measurement described in this invention, multiplexing techniques can be used. Multiplexing techniques allow the combined use of a common signal processing channel from or to the control system in order to sequentially access and modify the position of the control valves for example. Further, multiplexing techniques allow for the sequential or simultaneous reading of sensor information to a transmitter or control system, respectively. During the sequential adjustment of the hydraulic resistance of the fluid lines as described in this invention, the multiplexing principle is especially suitable for building a control system. With regard to the reading of sensor information as described for the performance monitoring of the separation modules, multiplexing enabled as the sequential and cyclic reading of discrete sensor signals is also applicable due to the rather slow changes in the pulse response signals that are to be monitored at column modules and system.

The invention claimed is:

1. A method for achieving uniform flow in parallel fluid paths comprising:

providing a separation system comprising:

(i) a first fluid path including: (a) a first separation module in communication with (b) a first adjustable flow restrictor;

(ii) a second fluid path, positioned parallel to the first fluid path, including: (a) a second separation module in communication with (b) a second adjustable flow restrictor;

(iii) a pressure sensor for measuring pressure loss over the whole separation system;

(iv) a system flow meter for measuring flow rate over the whole separation system;

(v) a single pump for pumping fluid into both the first fluid path and the second fluid path, and (vi) a system sensor positioned in an outlet of the separation system;

flowing fluid by operating the single pump;

measuring a characteristic of a flow through the whole separation system by the system sensor;

stopping fluid flow through the second fluid path and determining a first hydraulic resistance in the first fluid path by measuring pressure loss over the first fluid path, using the pressure sensor, and relating the measured pressure loss to a first flow rate of the first fluid path while the first fluid path is the only open fluid path and fluid flow through the second fluid path is stopped, and adjusting the first flow rate through the first fluid path to be a constant flow rate based on the system flow meter;

stopping fluid flow through the first fluid path and determining a second hydraulic resistance in the second fluid path by measuring pressure loss over the second fluid path, using the pressure sensor, and relating the measured pressure loss to a second flow rate of the second fluid path while the second fluid path is the only open fluid path and fluid flow through the first fluid path is stopped, and adjusting the second flow rate through the second fluid path to correspond to the constant flow rate of the first fluid path, based on the system flow meter;

identifying whether the first hydraulic resistance is higher than the second hydraulic resistance;

adjusting the first hydraulic resistance and the second hydraulic resistance to be the same, by adjusting the first adjustable flow restrictor positioned downstream of the first separation module and the second adjustable flow resistor positioned downstream of the second separation module sequentially and separately while stopping the fluid flow through the first fluid path and the second fluid path respectively, such that the first hydraulic resistance and the second hydraulic resistance is adjusted to be the same as the higher hydraulic resistance of the one fluid path of the first fluid path or the second fluid path identified to have the highest hydraulic resistance wherein the first flow rate and the second flow rate are kept at a same constant level across the first separation module and the second separation module during the adjusting, and the first hydraulic resistance and the second hydraulic resistance are synchronized; and using the first separation module and the second separation module in parallel to separate the fluid provided by operating the single pump.

2. The method of claim 1, wherein the identifying and the adjusting is automated using a control system.

3. The method of claim 1, wherein the separation module is a chromatography column.

4. The method of claim 1, wherein the separation module is disposable.

5. The method of claim 1, further comprising:

providing a first path sensor in the first parallel fluid path and a second path sensor in the second parallel fluid path;

measuring, using the first and second path sensors, a characteristic fluid property in the first and second parallel fluid paths;

measuring the characteristic fluid property with the system sensor positioned in the outlet of the separation system;

comparing the characteristic fluid property in the first parallel fluid path to the characteristic fluid property in the second parallel fluid path; and comparing the characteristic fluid property in the first and second parallel fluid paths to the characteristic fluid property measured by the system sensor to evaluate a performance of the separation system.

6. The method of claim 5, wherein the evaluation of the separation system comprises measurement of residence time or chromatographic efficiency.

7. The method of claim 5, wherein the characteristic fluid property measured includes one or more of a fluid flow rate, a concentration, a conductivity, a pH, a force, a temperature, a change in an absorption, a reflection, or an extinction of light or energy.

8. The method of claim 5, wherein the comparison of the characteristic fluid property in the first and second parallel fluid paths to the characteristic fluid property measured by the system sensor qualifies, monitors, or documents the performance of the separation system.

9. The method of claim 1, wherein the separation system further comprises a third fluid path, positioned parallel to the first and second fluid paths, passing through a third separation module and a third adjustable flow restrictor.

10. The method of claim 9, further comprising:

measuring a third hydraulic resistance in the third fluid path by stopping fluid flow through the first and second fluid paths;

identifying whether the third hydraulic resistance is higher than the first or second hydraulic resistances; and adjusting the third adjustable flow restrictor while fluid flow is stopped through the first fluid path and the second fluid path, wherein the first hydraulic resistance and the second hydraulic resistance each separately are equal to or higher than the third hydraulic resistance.

11. The method of claim 1, wherein the first adjustable flow restrictor is positioned downstream of the first separation module, and wherein the second adjustable flow restrictor is positioned downstream of the second separation module.

* * * * *